E. BLAKESLEE.

Cartridge-Box.

No. 1,861.

Reissued Feb. 7, 1865.

Witnesses:

Chas. N. Jacocks

Rufus Sanford

Inventor:

Erastus Blakeslee by his Atty

John E. Earle

N. PETERS, PHOTO-LITHOGRAPHER, WASHINGTON, D. C.

UNITED STATES PATENT OFFICE.

ERASTUS BLAKESLEE, OF NEW HAVEN, CONNECTICUT.

IMPROVEMENT IN CARTRIDGE-BOXES.

Specification forming part of Letters Patent No. 45,469, dated December 20, 1864; Reissue No. 1,861, dated February 7, 1865.

*To all whom it may concern:*

Be it known that I, ERASTUS BLAKESLEE, of New Haven, in the county of New Haven and State of Connecticut, have invented a new and useful Improvement in Cartridge-Boxes; and I do hereby declare the following to be a full, clear, and exact description of the same, when taken in connection with the accompanying drawings and the letters of reference marked thereon, and which said drawings constitute part of this specification, and represent, in—

Figure 3:
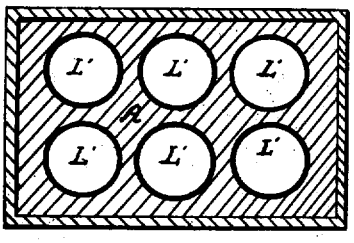
Figure 2:
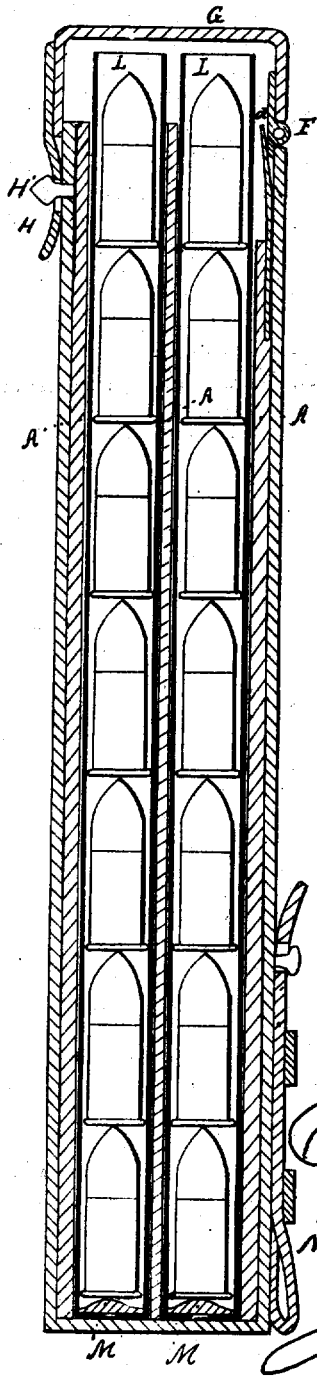

Figure 1, a perspective view; Fig. 2, a central section; Fig. 3, a cross-section.

My invention relates to improvements in cartridge-boxes designed to carry ammunition for the supply of that class of fire-arms which receive several cartridges into the butt of the stock, thence removed by the mechanism of the arm singly to the barrel, for discharge, as in the arm known as the "Spencer Rifle."

My invention consists in the construction and arrangement of a box for carrying several cartridges so that they may together be removed from the box, and the whole number of cartridges required to charge the arm may be inserted at one operation, instead of a separate operation for each cartridge, as now practiced.

To enable others to construct and use my improved cartridge-box, I will proceed to fully describe the same as fully illustrated in the accompanying drawings.

I represent my box as square; yet the form is no part of my invention. Other forms may be better.

The arm for which my box is designed to supply is usually constructed to receive seven charged cartridges. I therefore illustrate my case of sufficient depth to receive seven cartridges in each chamber.

I first form a block of wood, A, or other suitable material, the proper length and dimensions, in which I form one or more chambers, L′, placing a band of metal, B″, around the top of the block, as denoted in solid block, Fig. 2; other bands, if deemed necessary. I form a lid, G, of leather or other suitable material, which I secure to the block A by means of a hinge, F, as seen in Fig. 2, the said hinge provided with a suitable spring, *d*, or equivalent device, to force the lid to close and tend to hold it down when closed. I attach a loop, H, to the said lid, by which to secure it to the knob H′, as seen in Figs. 1 and 2. I cover the block A with leather, closing and stitching the leather around the block. B, Fig. 1, is a strap by which the box is suspended over the shoulder, one end attached to the front side of the box by a loop and eye, B′; the other end by a hook, C, and eye D. At the lower side of the box this strap can be adjusted to suit the wearer by moving the hooks E to an upper or lower hole in the strap, in the usual manner for adjusting such straps.

J is a pouch placed upon the box, closed by a tongue and button, K K′, designed to carry smaller cartridges for pistols.

L L are tubes formed of tin or other metal, the proper length to extend to the bottom of the box, and also out from the block sufficiently to allow them to be clasped for withdrawal. In the bottom of each tube I place a disk M, of india rubber or similar substance, rising in the center sufficiently to protect the rim of the cartridge from striking the bottom of the tube with sufficient force to explode. Within the said tube I place the proper number of cartridges, (usually seven, as represented,) as seen in Fig. 2. Each tube filled, my box is fully charged.

When it is required to charge the arm, draw one of the filled tubes from the box, present the mouth of the tube to the opening in the butt of the stock, allow the cartridges to slide from the tube into the chamber in the arm, or insert the filled tube into the chamber of the arm, withdrawing the tube, the cartridges remaining in the chamber of the arm. Replace the tube again in the box. The lid being closed by a spring prevents the cartridges from falling out if, in hasty using or other cause, the lid should be left unfastened.

The box is secured to the belt of the wearer by means of a loop, N, attached to the box for that purpose.

Having, therefore, fully described my invention, what I claim as new and useful, and desire to secure by Letters Patent, is—

A cartridge-box constructed in the manner described, to carry one or more movable tubes, each tube containing two or more cartridges, as and for the purpose specified.

ERASTUS BLAKESLEE.

Witnesses:

JOHN E. EARLE,

ORRIN C. BENEDICT.